United States Patent

Curry et al.

[11] Patent Number: 6,078,582
[45] Date of Patent: Jun. 20, 2000

[54] INTERNET LONG DISTANCE TELEPHONE SERVICE

[75] Inventors: James E. Curry, Herndon; Robert D. Farris, Sterling, both of Va.

[73] Assignee: Bell Atlantic Network Services, Inc., Arlington, Va.

[21] Appl. No.: 08/768,460

[22] Filed: Dec. 18, 1996

[51] Int. Cl.[7] .................................................. H04L 12/64
[52] U.S. Cl. ............................................ 370/356; 370/352
[58] Field of Search ...................................... 370/351, 352, 370/353, 354, 355, 356, 400, 401, 93.23, 389, 252, 410, 522, 466, 465, 468; 379/202

[56] References Cited

U.S. PATENT DOCUMENTS

| | | |
|---|---|---|
| 4,872,160 | 10/1989 | Hemmady et al. . |
| 4,958,341 | 9/1990 | Hemmady et al. . |
| 5,341,374 | 8/1994 | Lewen et al. . |
| 5,375,068 | 12/1994 | Palmer et al. . |
| 5,410,754 | 4/1995 | Klotzbach et al. . |
| 5,434,913 | 7/1995 | Tung et al. . |
| 5,483,587 | 1/1996 | Hogan et al. ............................ 379/202 |
| 5,490,247 | 2/1996 | Tung et al. . |
| 5,493,568 | 2/1996 | Sampat et al. . |
| 5,608,786 | 3/1997 | Gordon . |
| 5,661,790 | 8/1997 | Hsu . |
| 5,724,355 | 3/1998 | Bruno et al. . |
| 5,724,412 | 3/1998 | Srinivasan ............................. 379/93.23 |
| 5,726,984 | 3/1998 | Kubler et al. . |
| 5,751,706 | 5/1998 | Land et al. ............................... 370/352 |
| 5,751,961 | 5/1998 | Smyk . |
| 5,805,587 | 9/1998 | Norris . |
| 5,838,682 | 11/1998 | Dekelbaum et al. . |
| 5,850,433 | 12/1998 | Rondeau . |
| 5,867,495 | 2/1999 | Elliott et al. . |
| 5,883,891 | 3/1999 | Williams et al. . |
| 5,889,774 | 3/1999 | Mirashrafi et al. . |
| 5,923,659 | 7/1999 | Curry et al. . |
| 5,940,479 | 8/1999 | Guy et al. ............................. 379/93.01 |
| 5,940,598 | 8/1999 | Strauss et al. . |
| 5,953,338 | 8/1999 | Ma et al. ............................... 370/395 |

OTHER PUBLICATIONS

Yang, "INETPhone: Telephone Services and Servers on Internet", RFC 1789, Apr. 1995.

Edwin Margulies, "Understanding The Voice Enabled Internet", Aug. 1996, pp. 4–42; 12–1–3.

*Primary Examiner*—Huy D. Vu
*Attorney, Agent, or Firm*—McDermott, Will & Emery

[57] ABSTRACT

Long distance communications service between two communications systems is established by using a wide area packet switched network, for example the Internet, to transport signaling data and digitized communication traffic. Each communications system uses an interface server to encapsulate communication traffic and signaling data into data packets suitable for transport over the wide area packet switched network. The interface server accesses a routing and administration database to determine a destination address of a destination interface server based on the area code of the called number. Upon receiving the destination address and a prescribed bandwidth from the routing and administration database, the telephony server inserts the destination address to the data packets for a destination server for a second communications system. The packets are then output to the Internet, and subsequently routed to the destination server serving as an interface for the second communications system. Routing of packets is preferably performed using reserved virtual paths to guarantee quality of service.

5 Claims, 10 Drawing Sheets

FIG. 10A

| Area Code | NNX | ITS Address |
|---|---|---|
| ⋮ | | |

FIG. 10B

| POP(1) | POP(2) | Total Bandwidth | Unused Bandwidth |
|---|---|---|---|
| $ITS_A$ | $ITS_B$ | 155 Mb/s | 55 Mb/s |
| $ITS_A$ | $ITS_C$ | 466 Mb/s | 64 Mb/s |
| $ITS_B$ | $ITS_A$ | 622 Mb/s | 256 Mb/s |
| ⋮ | | | |

FIG. 10C

| Calling # | Guaranteed Service Level (Mb/s) |
|---|---|

FIG. 11

| Destination | Source Node | Destination Node | Reserved Bandwidth |
|---|---|---|---|
| $ITS_B$ | $IP_1$ | $IP_2$ | OC - 1 |
| $ITS_C$ | $IP_1$ | $IP_3$ | DS - 3 |
| RAS | $IP_2$ | $IP_3$ | OC - 9 |
|  |  |  |  |

# INTERNET LONG DISTANCE TELEPHONE SERVICE

TECHNICAL FIELD

The present invention relates to arrangements for public telecommunications systems to provide long distance telephone service over the Internet.

DESCRIPTION OF THE RELATED ART

Attention recently has been directed to implementing voice telephone service over the worldwide network now commonly known as the Internet. The Internet had its genesis in U.S. Government funded research which made possible national internetworked communication systems (called ARPA). This work resulted in the development of network standards as well as a set of conventions for interconnecting networks and routing information. These protocols are commonly referred to as TCP/IP. The protocols generally referred to as TCP/IP were originally developed for use only through ARPANET and have subsequently become widely used in the industry. TCP/IP is flexible and robust, in effect, TCP takes care of the integrity and IP moves the data. Internet provides two broad types of services: connectionless packet delivery service and reliable stream transport service. The Internet basically comprises several large computer networks joined together over high-speed data links ranging from ISDN to T1, T3, FDDI, SONET, SMDS, OT1, etc. The most prominent of these national nets are MILNET (Military Network), NSFNET (National Science Foundation NETwork), and CREN (Corporation for Research and Educational Networking). In 1995, the Government Accounting Office (GAO) reported that the Internet linked 59,000 networks, 2.2 million computers and 15 million users in 92 countries. It is presently estimated that the growth of the Internet is at a more or less annual doubling rate.

Referring to FIG. 1 there is shown a simplified diagram of the Internet. Generally speaking the Internet consists of Autonomous Systems (ASs) which may be owned and operated by Internet Service Providers (ISPs) such as PSI, UUNET, MCI, SPRINT, etc. Three such AS/ISPs are shown in FIG. 1 at 10, 12 and 14. The Autonomous Systems (ASs) are linked by Inter-AS Connections 11, 13 and 15. Information Providers (IPs) 16 and 18, such as America Online (AOL) and Compuserve, are connected to the Internet via high speed lines 20 and 22, such as T1/T3 and the like. Information Providers generally do not have their own Internet based Autonomous Systems but have or use Dial-Up Networks such as SprintNet (X.25), DATAPAC and TYMNET.

By way of current illustration MCI is both an ISP and an IP, Sprint is an ISP, and MicroSoft (MSN) is an IP using UUNET as an ISP. Other information providers, such as universities, are indicated in exemplary fashion at 24 and are connected to the AS/ISPs via the same type connections here illustrated as T1 lines 26. Corporate Local Area Networks (LANs), such as those illustrated in 28 and 30, are connected through routers 32 and 34 and links shown as T1 lines 36 and 38. Laptop computers 40 and 42 are representative of computers connected to the Internet via the public switched telephone network (PSTN) are shown connected to the AS/ISPs via dial up links 44 and 46.

The Information Providers (IPs) constitute the end systems which collect and market the information through their own servers. Access providers are companies such as UUNET, PSI, MCI and SPRINT which transport the information. Such companies market the usage of their networks.

In simplified fashion the Internet may be viewed as a series of routers connected together with computers connected to the routers. In the addressing scheme of the Internet an address comprises four numbers separated by dots. An example would be 164.109.211.237. Each machine on the Internet has a unique number which constitutes one of these four numbers. In the address the leftmost number is the highest number. By analogy this would correspond to the ZIP code in a mailing address. At times the first two numbers constitute this portion of the address indicating a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This continues until the packet arrives at the destination computer. The separate packets that constitute a message may not travel the same path depending on traffic load. However they all reach the same destination and are assembled in their original order in a connectionless fashion. This is in contrast to connection oriented modes such as frame relay and ATM or voice.

One or more companies have recently developed software for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers.

The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

Palmer et al. U.S. Pat. No. 5,375,068, issued Dec. 20, 1994 for Video Teleconferencing for Networked Workstations discloses a video teleconferencing system for networked workstations. A master process executing on a local processor formats and transmits digital packetized voice and video data, over a digital network using TCP/IP protocol, to remote terminals.

Lewen et al. U.S. Pat. No. 5,341,374, issued Aug. 23, 1994 for Communication Network Integrating Voice Data and Video with Distributed Call Processing, discloses a local area network with distributed call processing for voice, data and video. Real-time voice packets are transmitted over the network, for example to and from a PBX or central office.

Hemmady et al. U.S. Pat. No. 4,958,341, issued Sep. 18, 1990 for Integrated Packetized Voice and Data Switching System, discloses an integrated packetized voice and data switching system for a metropolitan area network (MAN). Voice signals are converted into packets and transmitted on the network. Tung et al. U.S. Pat. No. 5,434,913, issued Jul. 18, 1995, and U.S. Pat. No. 5,490,247, issued Feb. 6, 1996, for Video Subsystem for Computer Based Conferencing System, disclose an audio subsystem for computer-based conferencing. The system involves local audio compression and transmission of information over an ISDN network.

Hemmady et al. U.S. Pat. No. 4,872,160, issued Oct. 3, 1989, for Integrated Packetized Voice and Data Switching System, discloses an integrated packetized voice and data switching system for metropolitan area networks.

Sampat et al. U.S. Pat. No. 5,493,568, issued Feb. 20, 1996, for Media Dependent Module Interface for Computer Based Conferencing System, discloses a media dependent module interface for computer based conferencing system. An interface connects the upper-level data link manager with the communications driver.

Koltzbach et al. U.S. Pat. No. 5,410,754, issued Apr. 25, 1995, for Bi-Directional Wire Line to Local Area Network Interface and Method, discloses a bi-directional wire-line to local area network interface. The system incorporates means for packet switching and for using the Internet protocol (IP).

The known prior art does not disclose an efficient arrangement for establishing reliable long distance service via the Internet on a large scale. Known telephone-like communications via the Internet require each end station to have a TCP/IP address, resulting in an inefficient use of addressing resources. Moreover, the packet switched architecture of the Internet does not provide guaranteed bandwidth or bounded access latencies, resulting in poor quality voice communication over the Internet.

DISCLOSURE OF THE INVENTION

There is a need to provide long distance telephone service via the Internet to users of the public telecommunications network without access to a computer and without separate telephone user access to the Internet.

There is also a need to provide the general public with an economical and convenient long distance telephone service via the Internet without requiring the possession of computing equipment or familiarity with the Internet or its methodology on the part of the user.

There is also a need to to provide the public with impulse access to the Internet for voice communications without requiring maintenance of a subscription to an Internet access service.

There is an additional need to provide the foregoing types of telephone service over the Internet via the public telephone network without the necessity of reliance on signaling systems of interexchange carriers.

There is yet another need to provide voice service over public telephone systems via the Internet where the use of the Internet is optional to the Telco and transparent to the customer.

There is yet another need to provide voice service over public telephone systems via the Internet from telephone to telephone, from telephone to computer, from computer to telephone, and from computer to computer.

There is also a need to provide the foregoing type services with billing capabilities based substantially on equipment and methodologies presently available in the public switched telephone network.

These and other needs, as well as the drawbacks identified with respect to the known prior art, are resolved by the present invention, where a routing and administration database provides the destination address, based on at least a portion of a destination number, for a telephone server servicing a long distance telephone number and receiving voice traffic via the Internet.

According to one aspect of the present invention, a method of telecommunication over a wide area packet switched network comprises establishing a communication link between telephony servers serving respective telephone systems. The telephony servers each include a telephony platform and a wide area packet switched platform enabling the telephony servers to transfer signaling data and traffic data from the telephone system domain to the wide area packet switched network and vice versa.

The method includes sending, from a calling party, a called number corresponding to a called party and including an area code. The called number is sent to a first central office connected to a first telephone system. The called number is forwarded from the first central office to a first telephony server connected to the first telephone system and in communication with the wide area packet switched network. A routing and administration database identifies a second telephony server in communication with the wide area packet switched network and serving the called party in a second telephone system. The routing and administration database identifies the second telephony server using at least the area code. The first telephony server sends the called number to the second telephony server via the wide area packet switched network, and a communication link is selectively established between the first telephony server and the second telephony server according to a prescribed service level to establish communication between the calling and called parties. The communication link-between the servers minimizes the number of hosts on the wide area packet switched network. Hence, a plurality of communications links can be established between the two servers for calls to and from the respective area codes using the same destination addresses on the wide area packet switched network. The servers then use higher level protocol to divide and distribute the voice calls throughout the respective telephone system.

Another aspect of the present invention provides a method of telecommunication over a wide area packet switched network, where a communication link is established via the wide area packet switched network according to a prescribed service level. The method includes the steps of receiving, in a first telephony server connected to a first telephone system, a first data packet via a wide area packet switched network. The received first packet is transmitted by a second telephony server of a second telephone system, and includes (1) a destination address corresponding to the first telephony server, (2) a session identifier, and (3) a destination number having an area code served by the first telephony server. A condition of the destination number from a first central office serving the destination number is determined via a signaling communication network of the first telephone system. A second data packet carrying the session identifier and condition is then sent from the first telephony server to the second telephony server, and a communication link is selectively established between the first telephony server and the second telephony server according to a prescribed service level to establish communication between the destination number and a station served by the second telephony server. Signaling communications via the wide area packet switched network enable two telephone systems to establish telephone calls without the necessity of establishing separate landline signaling networks or leasing signaling communication links from interexchange carriers.

Still another aspect of the present invention provides a method of telecommunication over the Internet, where virtual paths are established between servers to maintain a guaranteed quality long distance calls between two telephone systems. The method includes establishing a dedicated virtual path having a prescribed bandwidth between at least first and second telephony servers. The first and second telephony servers have respective network addresses specifying points of presence on the Internet, and are connected to first and second telephone systems, respectively. A routing and administration database stores the prescribed bandwidth and, for each of the telephony servers, the network address and area codes served within the corresponding telephone system. A call request initiated by a calling party within the first telephone network, is received at the first telephony server. The call request includes a calling party number corresponding to the calling party and a called party number, the called party number including an area code. A routing request is then sent by the first telephony server to routing and administration database that includes the calling party number and the area code of the called party number. The routing and administration database outputs a bandwidth allocation and the network address of the second telephony server in response to the area code supplied by the routing request, wherein the routing and administration database provides the bandwidth allocation from the prescribed bandwidth. Signaling data packets are then sent by the first telephony server to the second telephony server along the dedicated virtual path, wherein the signaling data packets include the called party number and the bandwidth allocation. A communication link is then established between the first telephony server and the second telephony server according to the bandwidth allocation to establish communication between the calling party and a destination corresponding to the called party number.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 10A, 10B and 10C are diagrams illustrating tables stored in the routing and administration database of FIG. 6.

FIG. 11 is a diagram illustrating the stored virtual paths in a router of FIG. 6.

BEST MODE FOR CARRYING OUT THE INVENTION

Overview

The present invention implements long distance communications service between two communications systems by using a wide area packet switched network, for example the Internet, to transport signaling data and digitized communication traffic. Each communications system uses an interface server, referred to as a telephony server, to encapsulate communication traffic and signaling data into data packets suitable for transport over the wide area packet switched network.

In the context of using the Internet as the wide area packet switched network, the telephony server of one communications system packetizes the communication traffic or signaling data into TCP/IP format. The telephony server accesses a routing and administration database to determine a destination address to the data packets. The routing and administration database maintains an inventory of servers on the basis of area codes and destination address corresponding to the point of presence (POP) on the Internet, and monitors the use of bandwidth between the servers. Upon receiving the destination address and a prescribed bandwidth from the routing and administration database, the telephony server inserts the destination address to the data packets for a destination server for a second communications system. The packets are then output to the Internet, and subsequently routed to the destination server serving as an interface for the second communications system. Routing of packets is preferably performed using reserved virtual paths to guarantee quality of service. Upon receiving a data packet from the Internet, the destination server assembles the data packet to recover the communication traffic or signaling data. Using higher-level voice or signaling protocols known in the telephony art, the destination server directs the communication traffic or signaling data to the appropriate destination using tandem trunk lines or signaling communications paths.

Signaling

To facilitate understanding of the present invention, it will be helpful first to review the architecture and operation of a telephone network having Common Channel Interoffice (CCIS) capabilities. The following description of signaling in telephone systems will provide a better understanding of the use of signaling data by internet telephony servers in establishing communication links across the Internet.

Figure 1:
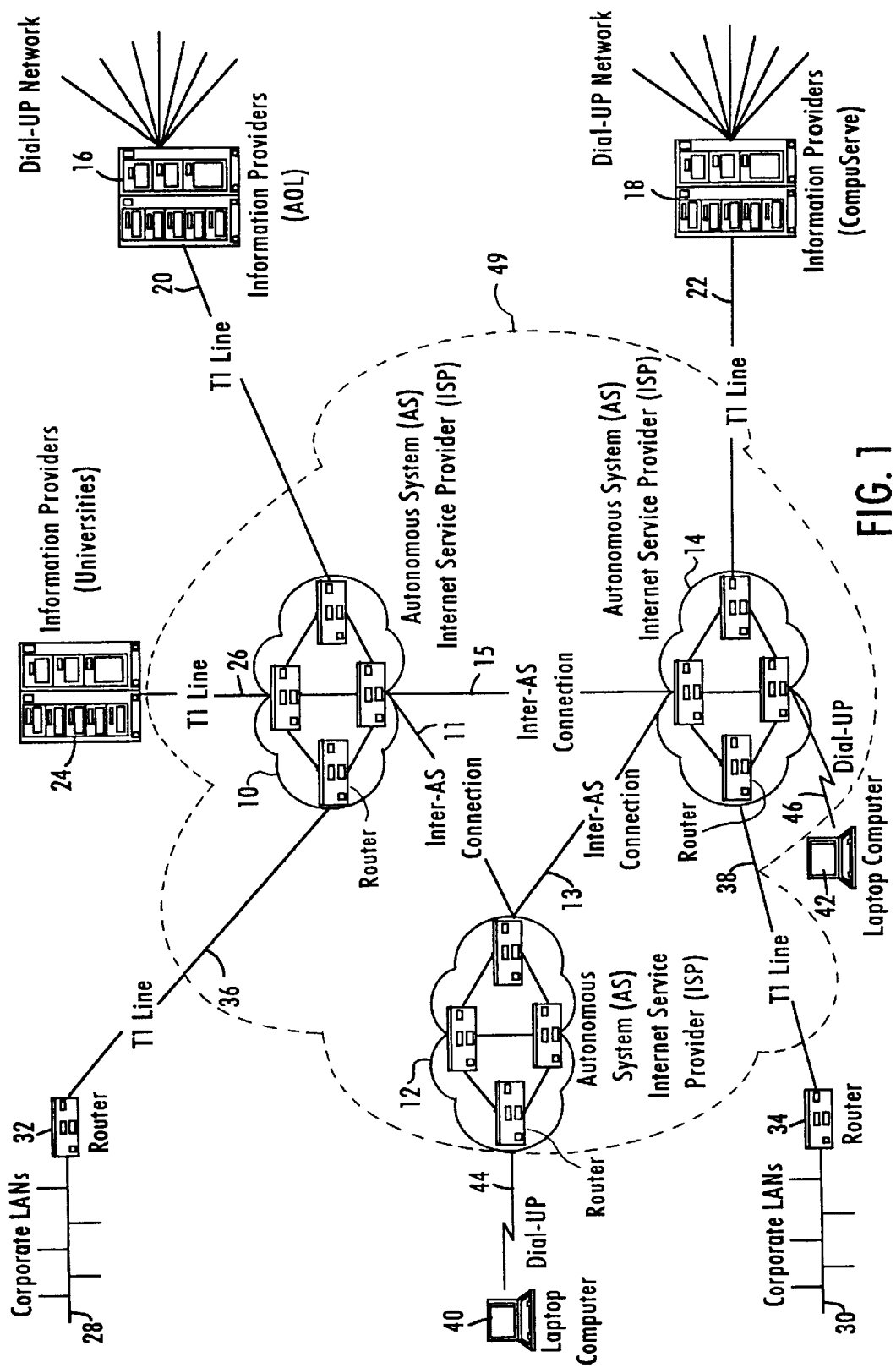
FIG. 1 is a simplified diagram of the Internet.
Figure 2:
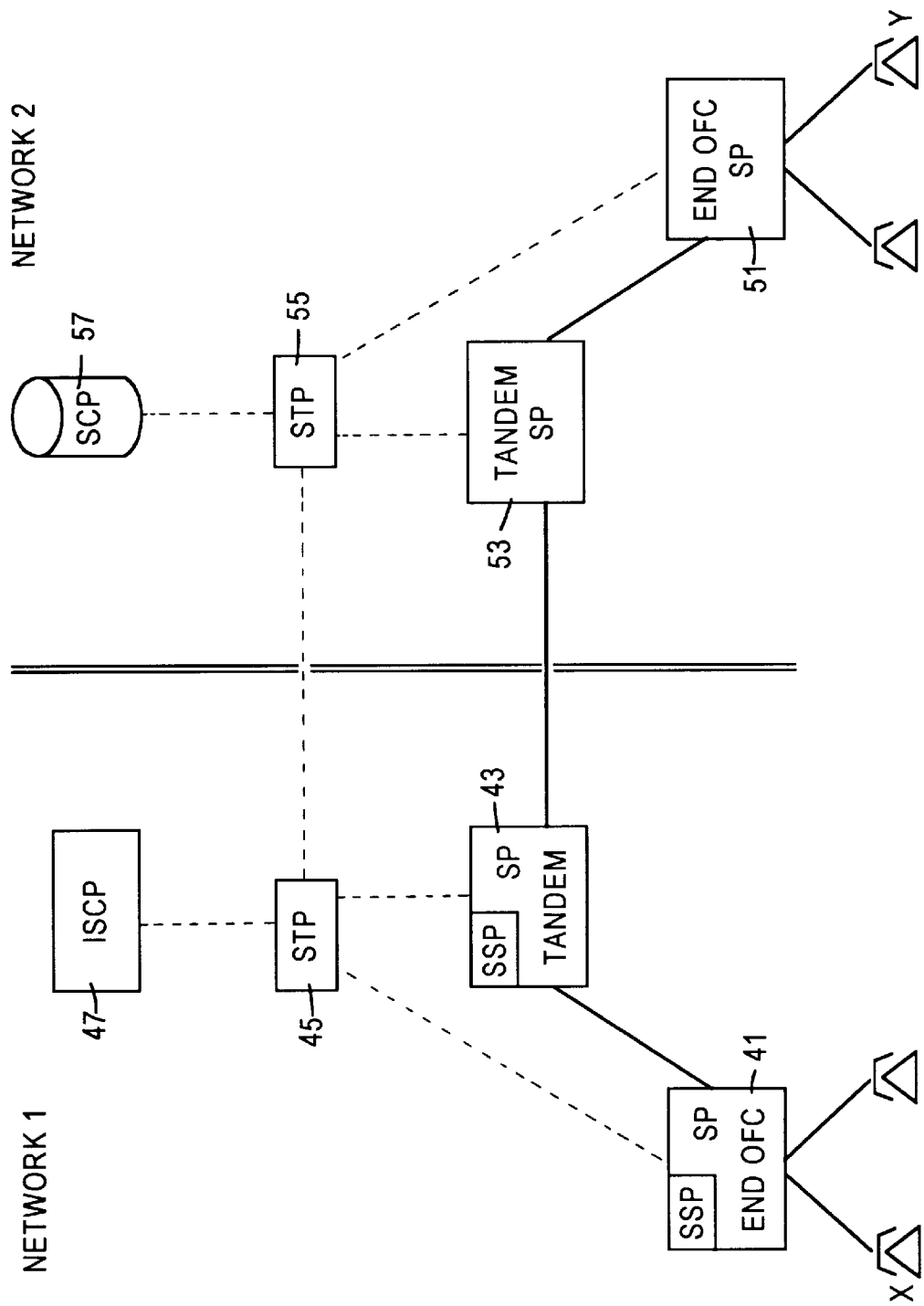
FIG. 2 is a simplified block diagram of a Public Switched Telephone Network and its SS7 signal control network.

Referring to FIG. 2 there is shown a simplified block diagram of a switched traffic network and the common channel signaling network used to control the signaling for the switched traffic network. In the illustrated example, the overall network actually comprises two separate networks 1 and 2. As shown, these networks serve different regions of the country and are operated by different local exchange carriers. Alternatively, one network may be a local exchange carrier network, and the other network may comprise an interexchange carrier network. Although the signaling message routing of the present invention will apply to other types of networks, in the illustrated example, both networks are telephone networks.

In FIG. 2, a first local exchange carrier network 1 includes a number of end office switching systems providing connections local communication lines coupled to end users telephone station sets. For convenience, only one end office 41 is shown. The first local exchange carrier network 1 also includes one or more tandem switching systems 43 providing connections between offices. As such, the first telephone network comprises a series of switching offices interconnected by voice grade trunks, shown as in FIG. 2 solid lines. One or more trunks also connect the tandem 43 to one or more switches, typically another tandem office 53, in the second network 2.

Each switching office has SS7 signaling capability and is conventionally referred to as a signaling point (SP) in reference to the SS7 network. In the first network 1, each switching office 41, 43 also is programmed to recognize identified events or points in call (PICs). In response to a PIC, either office 41 or 43 triggers a query through the signaling network to an Integrated Service Control Point (ISCP) 47 for instructions relating to AIN type services. Switching offices having AIN trigger and query capability are referred to as Service Switching Points (SSPs). The ISCP 47 is an integrated system, recognized in the art.

The end office and tandem switching systems typically include programmable digital switches with CCIS communications capabilities. One example of such a switch is a 5ESS type switch manufactured by AT&T; but other vendors, such as Northern Telecom and Siemens, manufacture comparable digital switches which could serve as the SPs.

Within the first network 1, the common channel interoffice signaling (CCIS) network includes one or more Signaling Transfer Points (STPs) 45 and data links shown as dotted lines between the STP(s) 45 and the switching offices. A data link also connects the STP 45 to the ISCP 17. One or more data links also connect the STP(s) 45 in the network 1 to those in networks of other carriers, for example to the STP 55 in the network 2.

Although shown as telephones in FIG. 2, the terminal devices can comprise any communication device compatible with the local communication line. Where the line is a standard voice grade telephone line, for example, the terminals could include facsimile devices, modems etc.

The network 2 is generally similar in structure to the network 1. The network 2 includes a number of end office SP type switching systems 51 (only one shown) as well as one or more tandem switching systems 53 (only one shown). The network 2 includes a CCIS network comprising one or more STPs 55 and data links to the respective SP type switching offices and to the CCIS system of other carriers, networks.

In the illustrated example, the second network 2 is not a full AIN type network. The switching systems do not have full AIN trigger and query capabilities. The network 2 includes a Service Control Point (SCP) 57, but the routing tables utilized in that database are more limited than those in the ISCP 47. The switching systems 51, 53 can query the SCP 57 for routing information, but the range of trigger events are more limited, e.g., to 800 number call processing.

An end office switching system 41 or 51 shown in FIG. 2 normally responds to a service request on a local communication line connected thereto, for example an off-hook followed by dialed digit information, to selectively connect the requesting line to another selected local communication line. The connection can be made locally through only the connected end office switching system but typically will go through a number of switching systems. For example, when a subscriber at station X calls station Y, the connection is made through the end office switching system 41, the tandem offices 43 and 53 and the end office switching system 51 through the telephone trunks interconnecting the various switching offices.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in-band signaling, the trunks would be engaged before a determination is made that the called line is available or busy. Particularly if the called line is busy, this would unnecessarily tie up limited voice trunk circuit capacity. The CCIS system through the STP's was developed to alleviate this problem.

In the CCIS type call processing method, the originating end office switching system, switching system 11 in the present example, suspends the call and sends a message through the CCIS network to the end office switching system serving the destination telephone line, i.e., to a terminating end office 21. The terminating end office determines whether or not the called station Y is busy. If the called station is busy, the terminating end office 21 so informs the originating end office 11 via CCIS message, and the originating end office provides a busy signal to the calling station. If the called station Y is not busy, the terminating end office 21 so informs the originating end central office 11. A telephone connection is then constructed via the trunks and end offices (and/or tandem offices) of the network between the calling and called stations.

For an AIN type service, such as call redirection based on data stored in the ISCP 47, the end offices and/or tandems are SSP capable and detect one of a number of call processing events, each identified as a 'point in call' (PIC), to trigger AIN type processing. Specifically, in response to such a PIC, a tandem 43 or end office switching system 41 suspends call processing, compiles a call data message and forwards that message via common channel interoffice signaling (CCIS) links and one or more STPs 45 to an ISCP 47. If needed, the ISCP 47 can instruct the particular switching office to obtain and forward additional information. Once sufficient information has reached the ISCP 47, the ISCP 47 accesses its stored data tables to translate the received data into a call control message and returns the call control message to the switching office via the STP 45 and the appropriate CCIS links. The office uses the call control message to complete the particular call through the public switched network in the manner specified by the subscriber's data file in the ISCP 47.

The SCP 57 offers a similar capability in the network 2, but the range of service features offered by that database are more limited. Typically, the SCP 57 offers only 800 number calling services with a limited number of related call routing options. The triggering capability of the tandem 53 and end office 51 is limited to 800 number recognition. If the end office 51 is capable of 800 number recognition and CCIS communication with the SCP 57, as shown, then the office 51 launches a CCIS query to the SCP 57 in response to dialing of an 800 number at a station set Y. The SCP 57 translates the dialed 800 number into an actual destination number, for example the telephone number of station X, and transmits a CCIS response message back to end office 51. End office 51 then routes the call through the public network to the station X identified by the number sent back by the SCP 57, using CCIS call routing procedures of the type discussed above.

Figure 3:
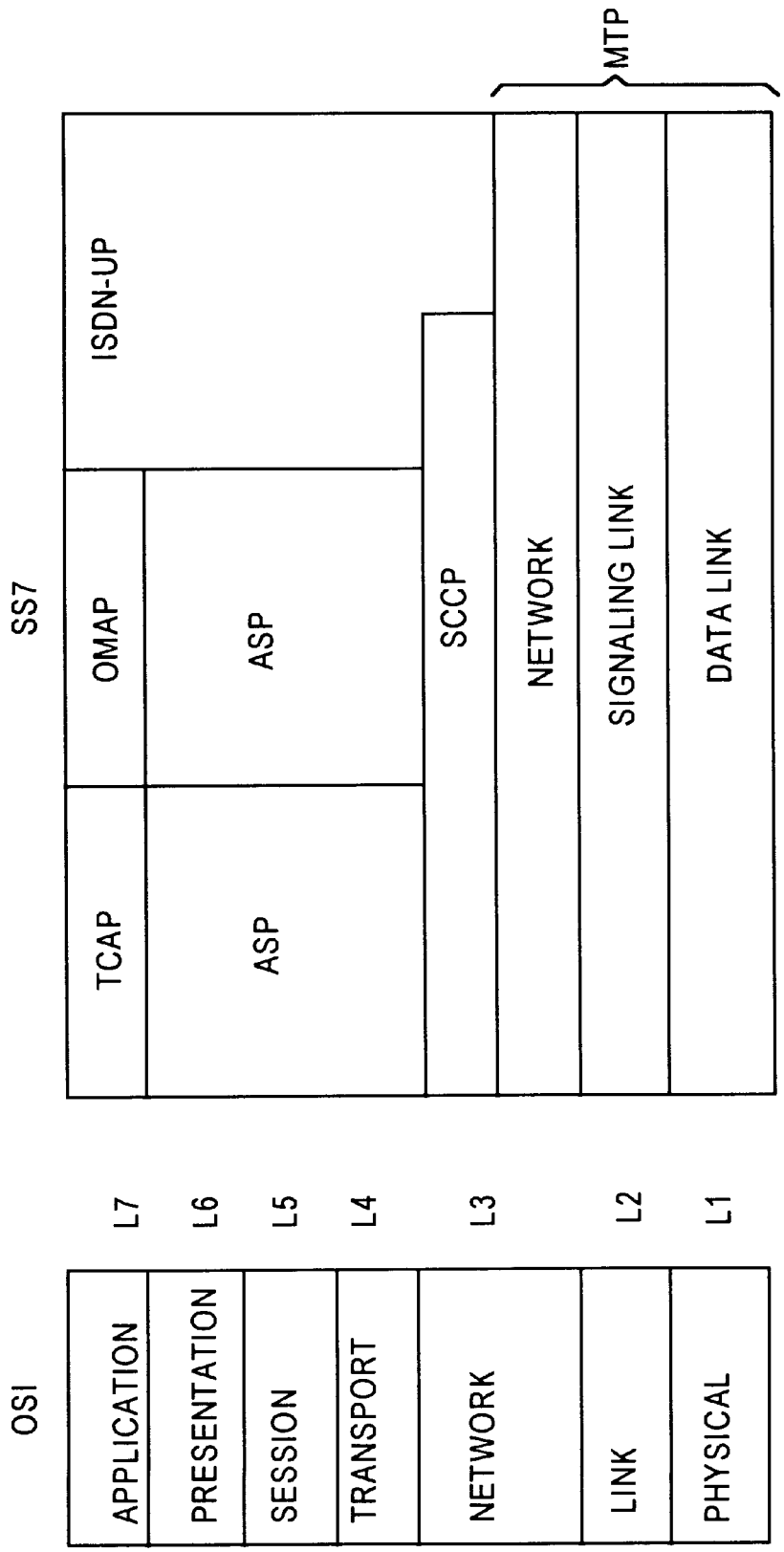
FIG. 3 depicts the protocol stack for SS7 and comparison thereof to the OSI model.

SS7 signaling protocol is based on the OSI model. The International Standards Organization (ISO) Open Systems Interconnection (OSI) reference model specifies a hierarchy of protocol layers and defines the function of each layer in the network. FIG. 3 shows the OSI model and the relationship thereof to the protocol stack for SS7. The lowest layer defined by the OSI model is the physical layer (L1). This layer provides transmission of raw data bits over the physical communication channel through the particular network. The layer next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. The network layer provides capabilities required to control connections between end systems through the network, e.g., set-up and tear-down of connections.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities.

Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, typically for accessing databases such as SCPs. For example, TCAP specifies the format and content of an initial query message from an SSP to an SCP and various response messages from the SCP back to the SSP. ISDN-UP is the actual call control application protocol of SS7. ISDN-UP specifies the procedures for setting up and tearing down trunk connections utilizing CCIS signaling. ISDN-UP messages, for example, include an Initial Address Message (IAM), an Address Complete Message (ACM) and an Answer Message (ANM)

SS7 specifies an Application Service Part (ASP) for performing the functions of the presentation, session and transport layers for the TCAP and OMAP protocols. The lower four layers of the SS7 protocol correspond to the lower three layers (network, link and physical) of the OSI model. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

The SS7 network layer (lower portion of L3) routes messages from source to destination. Routing tables for the signaling network layer facilitate routing based on logical addresses. The routing functionality at this layer is independent of the characteristics of particular links.

The signaling link layer (L2) performs flow control, error correction and packet sequence control. The signaling data link layer (L1) is the actual physical connection between nodes of the CCIS network. The signaling data link layer in CCIS provides full duplex packet switched data communications. The signaling data link layer element provides a bearer for the actual signaling message transmissions. In a digital environment, 56 or 64 Kbits/s digital paths carry the signaling messages between nodes, although higher speeds may be used.

At the equivalent of the OSI network layer (L3), the SS7 protocol stack includes a Signaling Connection Control Part (SCCP) as well as the network layer portion of the MTP. SCCP provides communication between signaling nodes by adding circuit and routing information to SS7 messages. The SCCP routing information serves to route messages to and from specific applications. Each node of the signaling network, including the various switching offices and databases in each network, is assigned a 9-digit point-code for purposes of addressing signaling messages through the CCIS network. Both the SCCP protocol and the MTP processing utilize these point codes.

Figures 4, 5:
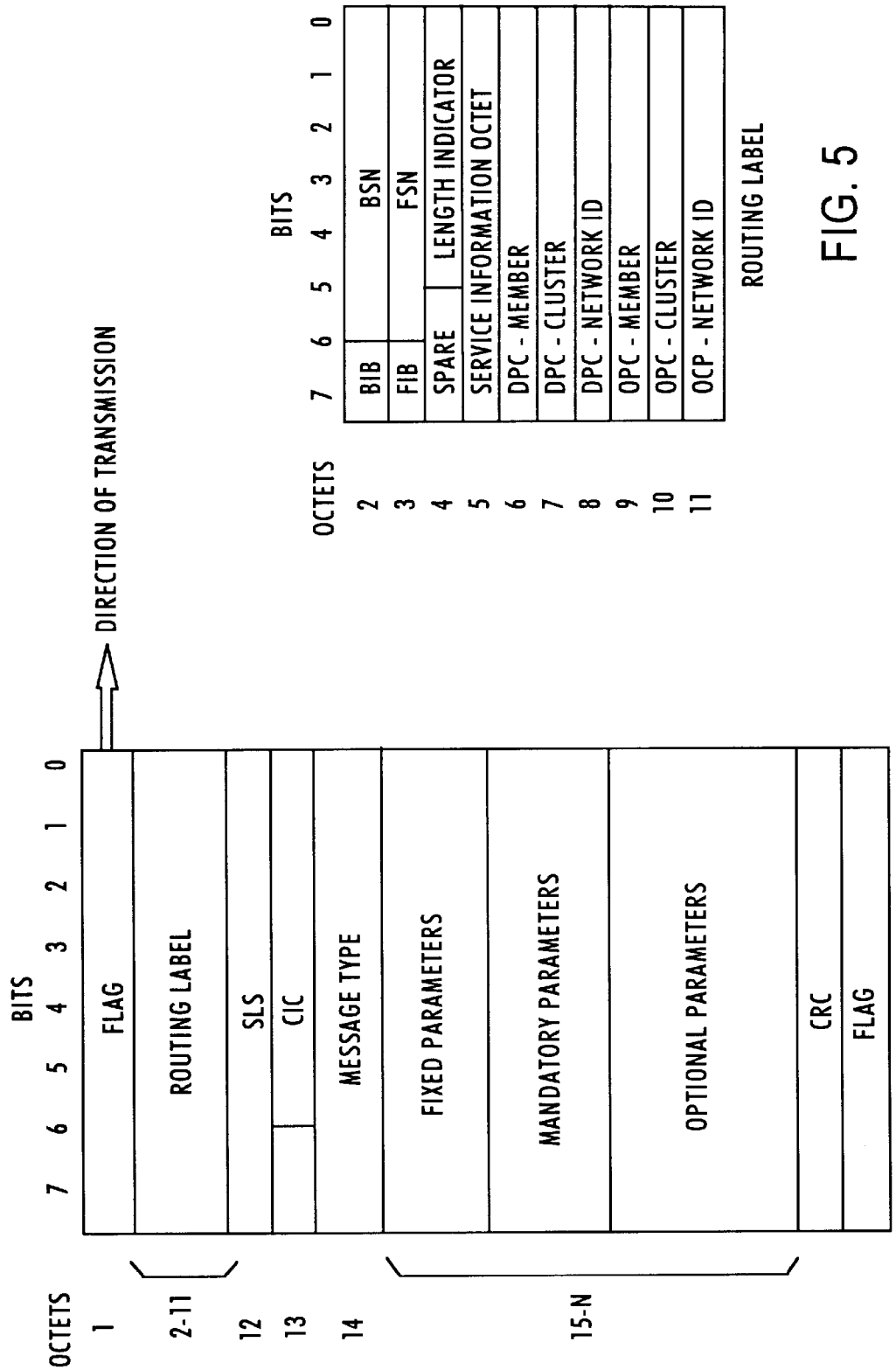
FIG. 4 illustrates in graphic form the layout of an SS7 protocol message packet.
FIG. 5 illustrates in graphic form the layout of the routing label portion of the SS7 protocol message packet shown in FIG. 4.

The SS7 messages traverse the network at all times. The messages themselves comprise digital serial messages that come into the STP. FIG. 4 provides a graphic illustration of an SS7 message packet. The first byte or octet of the message is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2–11 form a routing label as discussed later with regard to FIG. 3. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15–N contain the actual message, in the form of fixed parameters, mandatory parameters and optional parameters. The length of the mandatory parameters field and the optional parameters field are variable. There would be 16 other bits that have Cyclic Redundancy Codes (CRCs) in them and another flag which would constitute the end of the SS7 message (and typically the start of the next message). CRCs constitute a further error detection code which is a level 1 function in the protocol.

FIG. 5 is a graphic illustration of the routing label of the SS7 message packet. The first 7 bits of octet 2 constitute the Backward Sequence Number (BSN). The eighth bit is the Backward Indicator Bit (BIB) which is used to track whether messages have been received correctly. The length of an SS7 message is variable, therefore octet 4 contains a message length indicator.

Octet 5 is the Service Information Octet (SIO) This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill in signals. The MSU indicator type SIO octet is formatted and encoded to serve as an address indicator, as discussed below.

The routing label includes fields for both destination related addressing and point of origin addressing. The destination or 'called party' address includes octets 6, 7 and 8. Octets 9–11 carry origination point code information, for example member, cluster and network ID information.

In the example shown in FIG. 5, the three octets of the called party address contain an actual destination point code (DPC) identified as DPC-member, DPC-cluster and DPC-network ID information. In operation, the translation tables stored in the STP cause the STP to actually route based on the DPC without translating any of the DPC octets into new values. The called party address octets (6–8), however, may carry other types of called party addressing information and receive different treatment by the STP. For example, these octets may carry a global title (GTT) and subsystem number (SSN) information.

To distinguish the types of information carried in octets 6–8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6–8.

Additional details related to transport of signaling data over the Internet can be found in commonly-assigned, copending application Ser. No. 08/710,594, filed Sep. 20, 1996, entitled TELECOMMUNICATIONS NETWORK (attorney docket 680-188), the disclosure of which is incorporated in its entirety by reference.

Internet Long Distance Architecture

Figure 6:
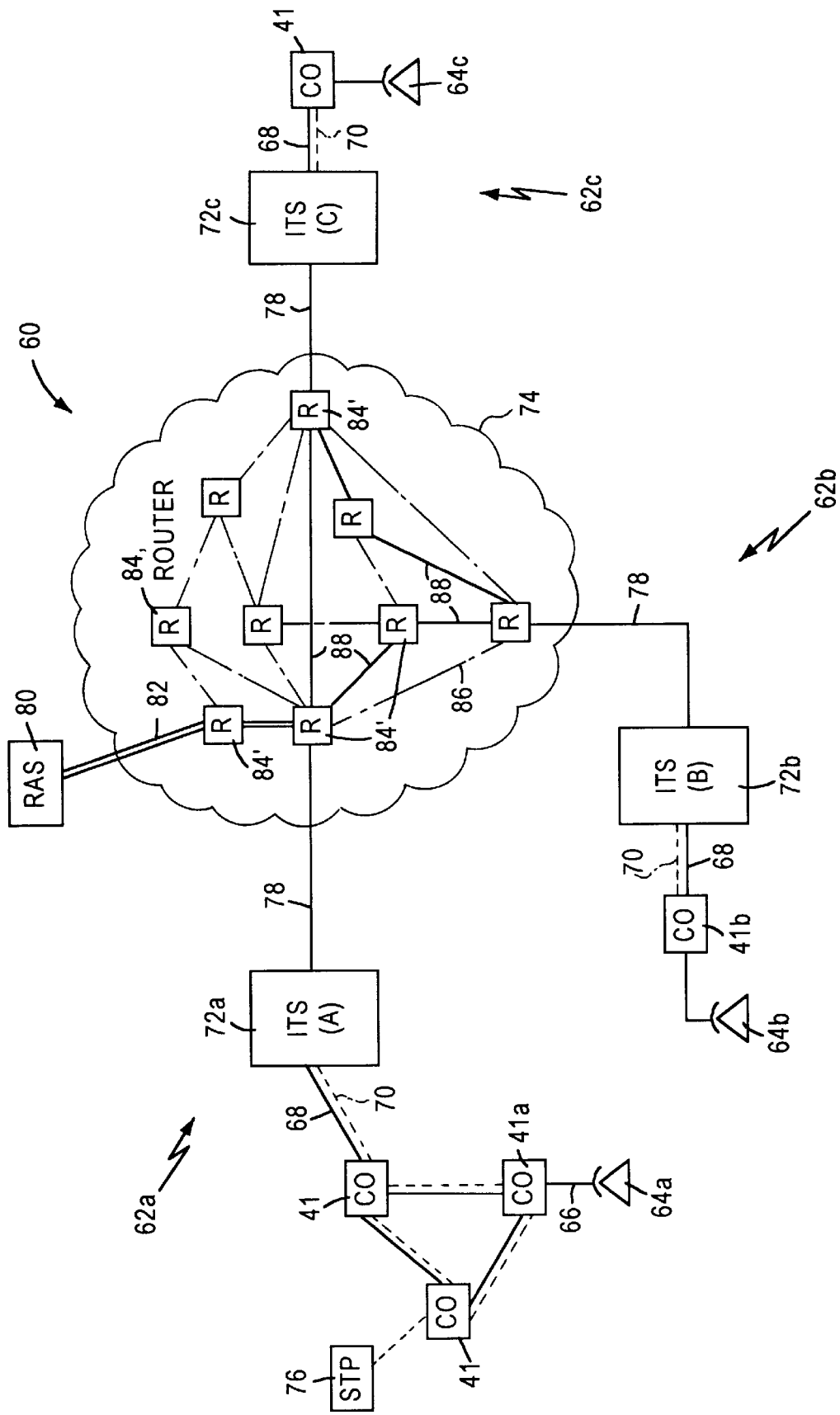
FIG. 6 is a block diagram illustrating a functional architecture of one proposal for providing long distance telephone service via public switched telephone networks and the Internet.

FIG. 6 is a block diagram illustrating the architecture of a telecommunications system using a wide area packet switched network such as the Internet. The telecommunications system includes a plurality of switched telecommunications networks 62a, 62b, and 62c operating in different geographical regions. For example, each telecommunications network 62 may be a public switched telephone network such as a Regional Bell Operating Company (RBOC), or a private communication network having a limited service area. Each network 62 has at least one assigned number code, such as an area code, that uniquely identifies service areas of that network. Each network 62 also includes a plurality of interconnected switching systems 41 serving customer premises terminals 64 via local loop connections 66. As described above with respect to FIG. 2, each network 62 also includes trunk lines 68 and signaling lines 70 that support the interoffice signaling for the particular network.

Each telephone system 62 also includes an Internet telephony server (ITS) 72 that provides an interface between the corresponding telephone system 62 and the wide area packet switched network 74, for example the Internet. The ITS 72a is typically connected to a local central office 41 via a standard voice grade line or trunk connection 68, for example a T-1 or T-3 connection. Alternatively the hardware associated with the ITS 72a may be situated at the central office 41 and associated with the switching system.

The ITSs 72 include signaling capabilities, for example SSP capabilities, and are connected into the CCIS network as indicated by the links 70 to the illustrative STP 76. The SSPs serving the corresponding ITS 72 are inter-connected with the central office SSPs and CCIS network. The ITSs may be linked for signaling purposes by conventional F links. The Internet Modules are connected to the Internet 74 by T1/T3 trunks 78.

The system 60 also includes a routing and administration server (RAS) 80 that includes a routing and administration database for managing call routing translations and user access permissions. The RAS 80 is shown as an Internet node having a dedicated virtual path 82, described below. The routing and administration database stores records for every area code/NNX served by a telephony system 62, along with the network address for the corresponding ITS 72. FIG. 10A is a diagram illustrating the stored records of the routing and administration database of the RAS 80 stored in a translation table 90. The translation table 90 stores for each area code and central office code (NNX) the IP address of the corresponding ITS 72, also referred to as the ITS address. The routing and administration database in the RAS 80 thus stores all area codes serviced by a given telephone system 62a, as well as the Internet address identifying the point of presence (POP) for the serving ITS 72a. Hence, the RAS 80 serves as a pointer to identify a destination Internet telephony server 72 based on the area code of the called station. If a telephone system 62 includes a plurality of ITSs 72 within a selected area code, then the translation table 90 provides the unique IP address based on the area code and central office code being accessed.

For example, the ITS 72c processes a telephone call for called party 64a initiated by the calling party 64c by sending a routing request to the RAS 80. The routing request will include the area code of the called party 64a. The RAS 80 accesses the internal translation table 90 to determine the ITS address corresponding to the area code of the called party. If the destination telephone network has a plurality of internet telephony servers within an area code, the RAS 80 may send to the ITS 72c a signaling message requesting the central office code (NNX) as well. Once the RAS 80 has sufficient information to identify the specific ITS 72a serving the called party 64a, the RAS 80 sends the IP address of the ITS 72a serving the specified area code to the ITS 72c. The ITS 72c in response sends signaling and/or voice traffic to the ITS 72a by outputting data packets having the IP address of the ITS 72a as a destination address. Once received by the ITS 72a, the signaling and/or voice traffic is recovered from the payload of the data packets and processed by upper-layer protocol to establish the communication link between the calling station 64c and the called station 64a via the Internet.

A particular aspect of the disclosed embodiment is the use of dedicated virtual paths established in the Internet 74 to maintain a prescribed service level, i.e., quality of service, for the calling party. Specifically, the Internet 74 includes a plurality of routers 84 (R) that route data packets along available paths 86 based on known algorithms. As known in the art, the separate packets that constitute a message may not travel the same path 86 depending on traffic load.

However they all reach the same destination and are assembled in their original order in a connectionless fashion.

In order to provide guaranteed service quality during long distance telephone calls via the Internet, the data packets can be transported on dedicated virtual paths at a minimum guaranteed bandwidth and latency, for example 28.8 kbps per telephone call in each direction. The disclosed embodiment establishes dedicated virtual paths 88 for large-scale transport of packets carrying long distance traffic to different telephone systems 62. Specifically, selected routers 84' reserve a predetermined amount of bandwidth, for example, twenty percent of the overall capacity, for virtual paths for use by the RAS and the ITSs 72 in transporting voice and signaling data. FIG. 11 is an example of an internal matrix table 92 in one of the routers 84', where the router 84' receiving a data packet from a source node (i.e., another router) outputs the received data packet to a predetermined destination node based on the destination IP address in the data packet. As shown in FIG. 11, the router reserves a 51.8 MB/s (OC-1) path between source and destination nodes IP1 and IP2 for packets having a destination address corresponding to the ITS (B) 72b. Hence, assuming a router 84' has a capacity of switching up to 466.56 MB/s (OC-9), the router can reserve one virtual path at 51.8 MB/s (OC-1), another path at 44.7 MB/s (DS-3), and a third virtual path at 155.5 MB/s (OC-3) between two nodes.

Hence, a complete virtual path having a predetermined bandwidth between two ITSs 72 can be established by forming a sequence of routers, each having predetermined path segments for transporting data packets along the virtual path to the next router or node. The virtual path is initially arranged by contracting with the Internet service provider controlling each router 84' in the desired virtual path. The ISP will then program the router 84' and any associated Autonomous System (AS) with the table 92 to guarantee the desired bandwidth along the virtual path.

Once the sequence of routers has been established, the end-to-end virtual path (POP(1) to POP(2)) is stored as a virtual path lookup table 94 in the RAS 80 database, along with the total available bandwidth, shown in FIG. 10B. The RAS 80 also monitors unused bandwidth by allocating bandwidth for each routing request. Hence, the RAS 80 is able to monitor traffic along a virtual path to determine whether a data rate in a communication link should be changed. If the RAS 80 determines that a virtual path has little traffic, then the RAS may specify a higher data rate for the communication link. However, if the RAS 80 determines that a large amount of traffic exists on the virtual path, then the data rate may be reduced to the minimum guaranteed service level stored in the RAS 80 database for the calling number, shown in FIG. 10C.

An alternate arrangement for providing a communication link according to a prescribed service level involves using Internet Protocol, version 6 (IPv6). IPv6 incorporates a variety of functions that make it possible to use the Internet for delivery of audio, video, and other real-time data that have guaranteed bandwidth and latency requirements. Hosts can reserve bandwidth along the route from source to destination. Hosts can specify loose or strict routing for each hop along a path. In addition, packets are assigned a priority level, ensuring that voice or video transmission is not interrupted by lower priority packets.

As shown in FIG. 6, a group of virtual paths 88 enable transmission of signaling and traffic data between the ITSs 72a, 72b and 72c via the Internet at prescribed service levels. Signaling information between the ITSs 72 and between an ITS 72 and the RAS 80 will typically be given highest priority. Service levels for subscribers at calling stations 64 are typically arranged at different levels, depending on subscriber preference and cost. Once a service level for a subscriber is established, the guaranteed service level is stored in the RAS 80 database. Alternately, an image of the routing and administration database in the RAS 80 may be stored in the ITS 72 to reduce access via the Internet.

Figure 7:
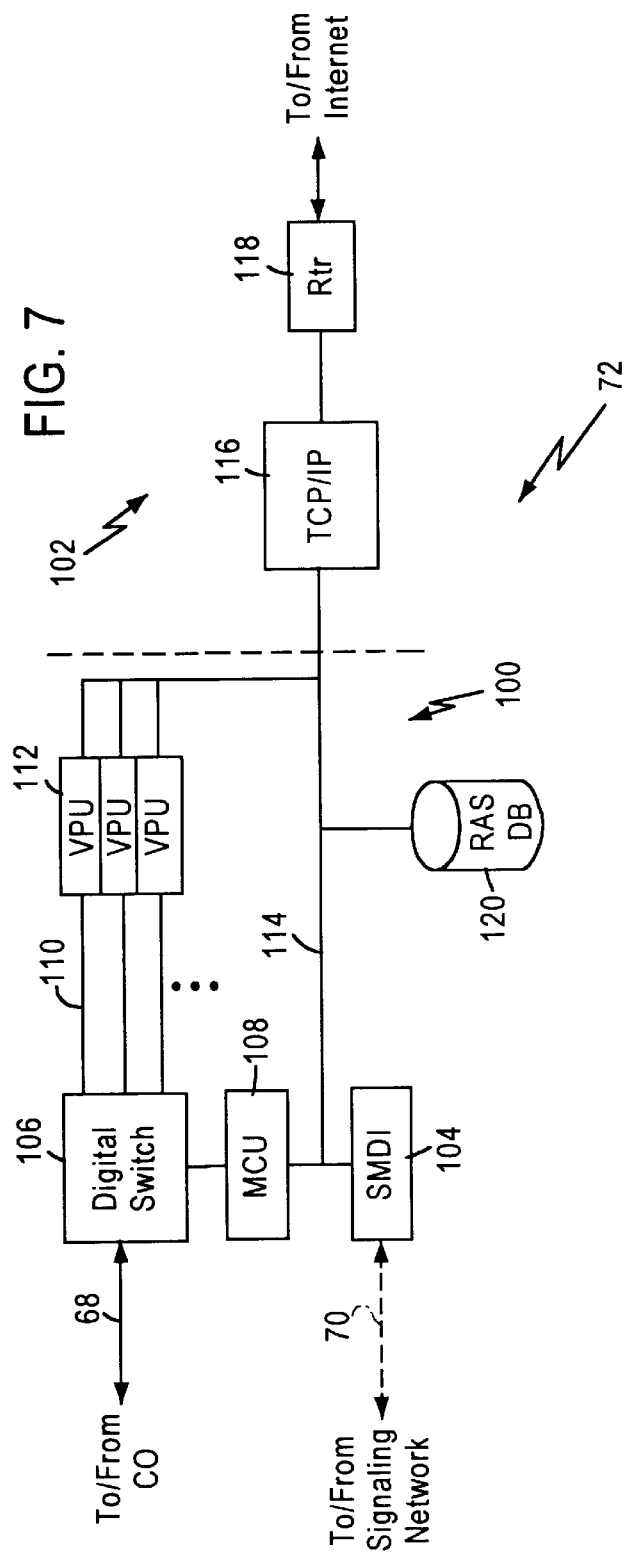
FIG. 7 is a block diagram of the server of FIG. 6.

FIG. 7 is a block diagram of the ITS 72 of FIG. 6. The ITS 72 includes a telephony platform 100 and an Internet server platform 102. The telephony platform 100 performs basic telephony functions, including incoming call detection (ringing, trunk seizure, etc.), call supervision/progress detection (busy tone, disconnect, connect, recorded announcement, dialtone, speech, etc.), call origination, DTMF, call termination, call disconnect, switch hook flash, etc.

As shown in FIG. 7, the telephony platform 100 of the ITS 72 includes a simplified message desk interface (SMDI) 104 that sends and receives signaling data to the CCS signaling network, a digital switch 106 that sends and receives communication traffic from the trunk line 68, a master control unit (MCU) 108 that controls the overall operations of the ITS 72, including controlling the switch 106 to separate data traffic on the trunk line 68 into single 64 kb/s data channels 110. The data on each of the data channels 110 is compressed by a voice processor unit (VPU) 112 into compressed communication data having a data rate of approximately 16 kbit/s or lower. The compressed communication data may be either voice data or other data, for example facsimile data.

The compressed communication data is output to a local area network (LAN) 114, for example an Ethernet-based network at 100 Mbit/s. The LAN 114 carries data signals between the MCU 108 and the voice processing units 112. The system also includes T1 type digitized audio links 110 between the switch 106 and each of the VPU's 112. The LAN 114 transports data packets to a packet assembler/disassembler (PAD) 116 that packetizes data on the LAN 114 into TCP/IP packets for transport onto the Internet 74. The PAD 116 also recovers signaling and communication data from data packets received by the router 118. Hence, the PAD 116 receives signaling information from the SMDI 104 originated from the signaling network 70, and outputs signaling data recovered from data packets received from the Internet 74 to the SMDI 104 for subsequent call processing via the signaling links 70.

The ITS 72 also may include a RAS database 120 that is an image of the database in the RAS server 80. The RAS database 120 enables translation information to be obtained without accessing the RAS 80 via the Internet 74. In this arrangement, the ITS 72 would monitor its own bandwidth allocation as stored in the RAS database 120.

The router 118 is of the type now generally used in Internet practice. If desired, the router 118 may also be connected to a Domain Name Service (DNS) server and a Dynamic Host Configuration Protocol (DHCP) server of the type conventionally used by Internet Service Providers in existing Internet Service.

Internet Long Distance Call Processing

Figure 9A:
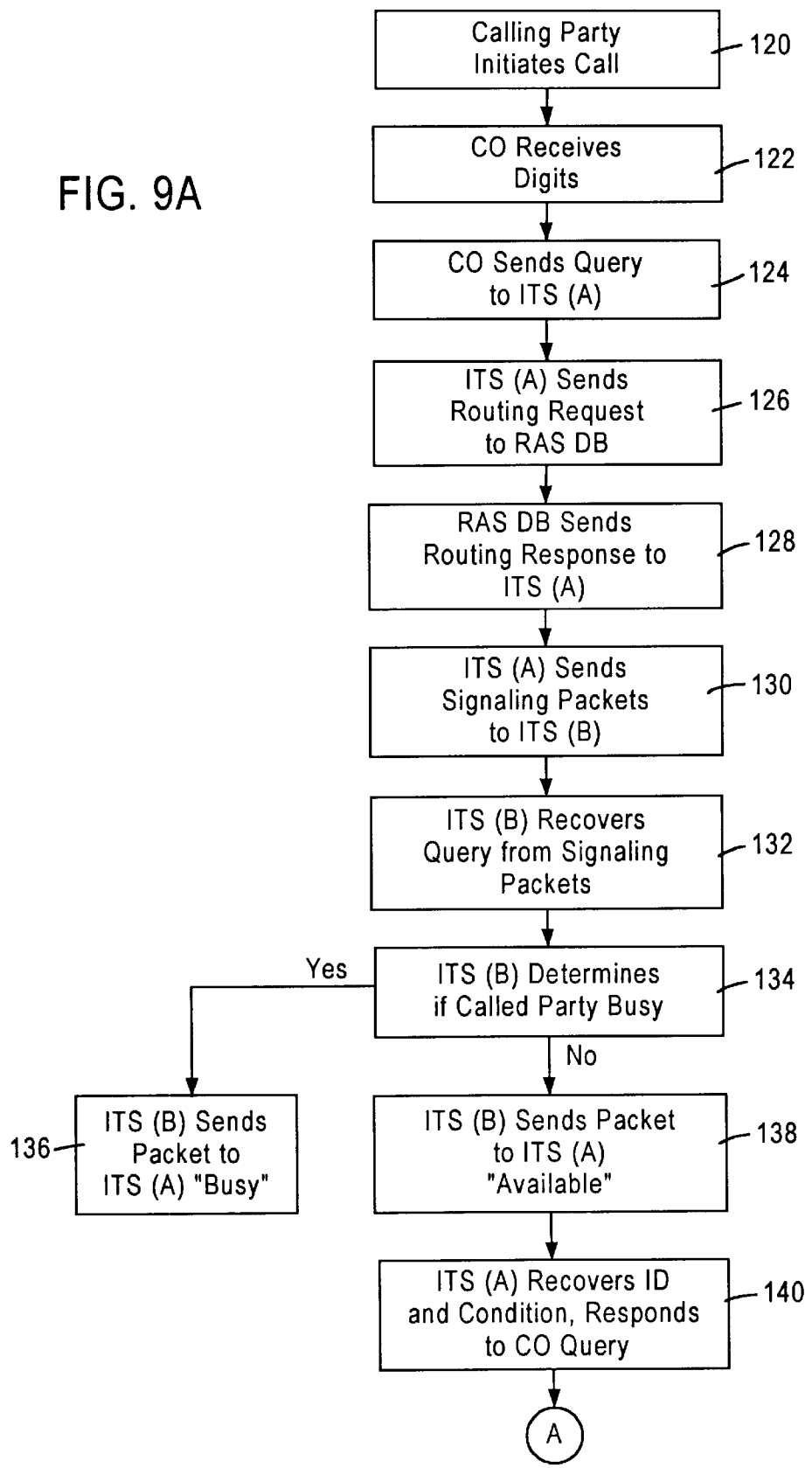
FIGS. 9A and 9B are flow diagrams summarizing a method of establishing long distance service according to an embodiment of the present invention.

An exemplary call using the arrangements of FIGS. 6 and 7 will now be described with respect to FIGS. 9A and 9B. The system of FIG. 6 establishes an Internet connection to link a calling to a called telephone without the necessity of either party possessing or using personal or office computer equipment. The subscriber in this example uses the POTS station 64a to initiate an Internet call to a called party at the POTS station 64*b* in step 120. The caller goes off-hook and dials *82. This prefix has been established by the Telco offering the service as a predesignated prefix with which the public may initiate an Internet telephone call. The dialing of the prefix *82 is followed by the dialing of the directory number of the called party at the station 64*b* including the area code.

The central office switching system responds to the off-hook and receives the dialed digits from the calling station in step 122. The central office switching system analyzes the received digits and determines from the prefix *82 that the call is an Internet call. Responsive to its programming it knows that the call must be completed through a remote central office and that further processing is necessary. The originating central office 41*a* suspends the call and sends a CCIS query message in step 124 to the ITS 72*a* via the signaling channel 70.

In response to the query message, the ITS 72*a* identifies the internet telephony server servicing the called party 64*b* by sending in step 126 a routing request, including the number of the calling party 64*a* and the area code of the called party 64*b*, to the RAS 80 via the Internet 74. Alternately, the ITS 72*a* may access its own internal routing and administration database 120, shown in FIG. 7, which is an image of the routing and administration database in the RAS 80. The routing and administration database (RAS DB) accesses the internal translation tables, shown in FIGS. 10A and 10C, and sends a routing response in step 128. The routing response includes the identity (e.g., IP address) of the ITS 72*b* serving the called party 64*b*, the predetermined virtual path between the two servers, and the minimum guaranteed service level for the calling station 64*a*.

The ITS 72*a* then sends in step 130 a signaling message in the form of a query message packetized in TCP/IP packets having the IP address of the ITS 72*b* as the destination address. The signaling packets are received via the virtual paths 88 by the ITS 72*b* in step 132 and include a session ID, the called number, the calling number, and the requested data transmission rate having a minimum data rate corresponding to the prescribed service level. The ITS 72*b* recovers the query message from the payload of the TCP/IP packets in step 132, and determines whether or not the called station 64*b* is busy in step 134.

If the called station 64*b* is busy, the receiving central office 41*b* so informs the ITS 72*b* via the signaling network 70, and the ITS 72*b* returns a busy message to ITS 72*a* in step 136 using signaling packets in TCP/IP protocol. The ITS 72*a* recovers the busy message from the received data packets via the Internet 74, and informs the originating central office via the signaling network 70 of the busy condition. The originating central office provides a busy signal to the calling station.

If the called station is not busy, the receiving central office 41*b* busies out the called station line 64*b* by blocking all calls. The receiving or destination central office 41*b* then informs the originating central office 41*a* via the ITS servers 72*b* and 72*a* and the Internet that the called line is available and waiting. Specifically, the ITS 72*b* in step 138 sends a data packet including the session identifier and the available condition of the called party 64*b* to the ITS 72*a* via the Internet. The ITS 72*a* recovers the signaling information including the session ID and available condition from the data packet transmitted by the ITS 72*b*, and responds in step 140 to the query from the originating central office 41*a*.

Figure 9B:
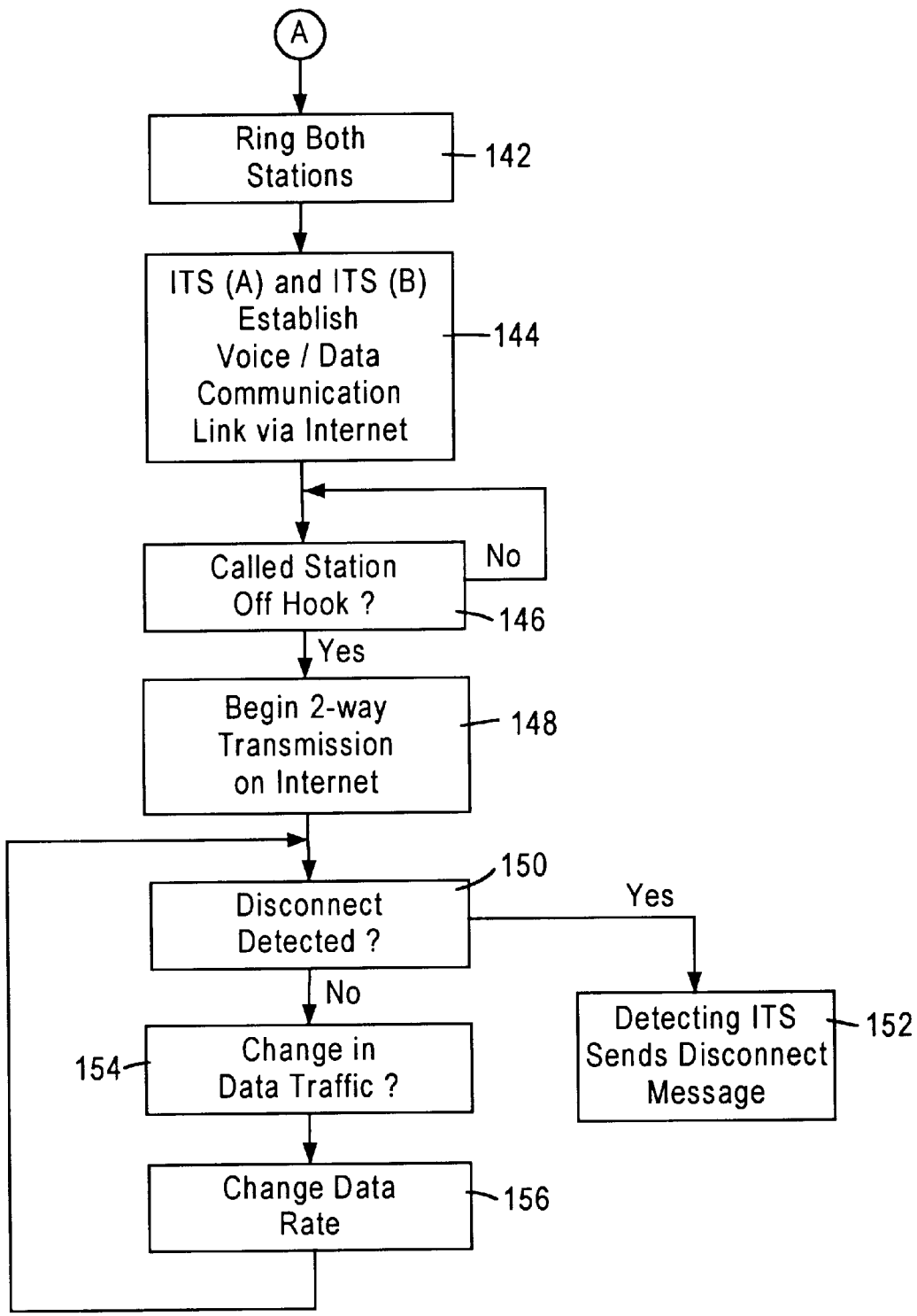

Referring to FIG. 9B, an Internet virtual connection is then established between the calling and called stations. The receiving or destination central office 41*b* provides a ringing signal to the called station 64*b* and the originating central office 41*a* sends ringback tone back through the local loop 66 to the calling station 64*a* in step 142. At the same time, the ITS 72*a* and the ITS 72*b* establish a two-way communication link on the predetermined virtual path at the prescribed service level in step 144. Specifically, the initial packets transmitted by each ITS 72 will have identification information for the destination switches. Alternately, each ITS 72 will use the reserved voice path connections for transmitting voice data packets. When the called station 64*b* goes off-hook in step 146 and the Internet virtual connection is completed the conversation via the Internet can commence in step 148.

Each of the ITSs 72*a* and 72*b* monitor the communication link to detect a disconnect in step 150. If a disconnect condition is detected by one of the ITSs 72 in step 150 via a signaling message from the corresponding central office 64, then the ITS 72 sends a disconnect message as a signaling data packet to the corresponding ITS 72 via the Internet 74 in step 152.

In addition, the ITSs 72*a* and 72*b* and the RAS 80 monitor the traffic on the established virtual communication path. If any of the ITSs 72*a* or 72*b* or the RAS 80 detects a substantial increase or decrease in traffic, the detecting node outputs a signaling data packet indicating the detected change to the corresponding ITSs 72*a* and/or 72*b*. If in step 154. a signaling data packet is received indicating a detected change in the traffic on the virtual communication path 88, the ITS servers 72*a* and 72*b* in step 156 change the data rate based on the received data rate value in the signaling data packet and in accordance with the prescribed service level.

Figure 8:
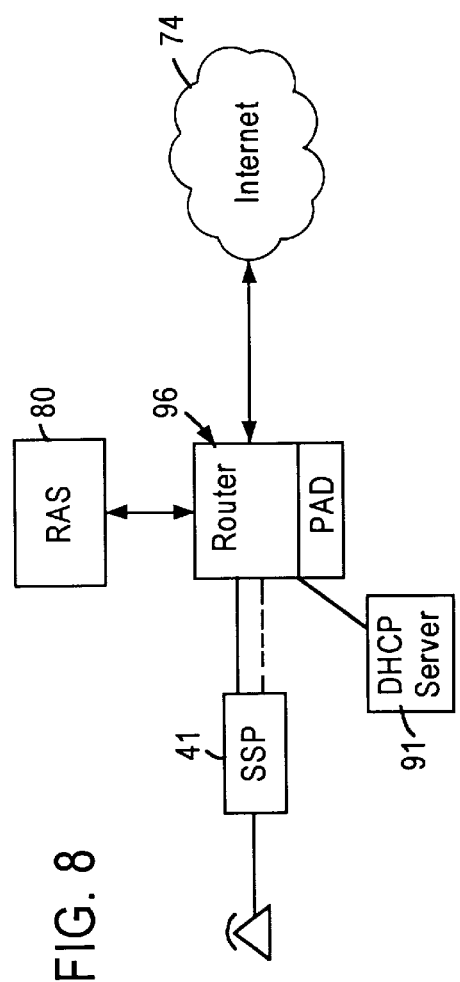
FIG. 8 is is a block diagram illustrating an alternate architecture for providing long distance telephone service via public switched telephone networks and the Internet.

FIG. 8 is a block diagram of an alternate implementation of Internet long distance service, where an internet module 96 including a router handles routing of low-grade Internet telephone calls using conventional compression and routing techniques. For example, the originating central office 64 may send a CCIS message to the Internet Module 96 including the directory numbers of the calling station and the called station and requesting establishment of an Internet connection (or virtual connection) between the two.

The router in the Internet Module 96 may then react to receipt of that CCIS signal and request the temporary assignment of Internet addresses for the processors associated with the respective central offices. Upon completion of the assignment of the addresses module 96 may send a CCIS signal to the originating central office advising of that fact. When the originating central office receives the message that the addresses have been assigned the switching system connects the originating local loop to the Internet Module 96.

The Internet Module router then sends a request for the assignment of temporary IP addresses for the two directory numbers to a DHCP server 91. The DHCP server hears the message and offers an IP address for each directory number for a certain time period which may be determined by the router or the server. The router may request a specified time period and the DHCP server may decline and offer a longer or shorter period, seeking mutual agreement. Upon agreement the addresses are accepted and assigned. The originating Internet Module 96 next triggers a CCIS message to a destination Internet Module (not shown) which includes the temporary IP address assigned to the called directory number and associated processor.

The transmission of data packets through the Internet using the Internet module 96 and the DHCP server 91 does not guarantee bandwidth or a minimum latency. Hence, if the Internet module determines that the calling station is a subscriber that requests high priority traffic, the Internet module 96 accesses the RAS 80 instead of the DHCP server 91 in order to obtain a predetermined communication path reserved for guaranteed bandwidth and latency, as described above with respect to FIG. 6. Hence, the Internet module 96 performs the functions of the ITS 72 upon detecting a calling station having a prescribed service level that requires a guaranteed bandwidth by obtaining the routing information from the RAS 80.

According to the present invention, routing and administration servers provide translation addresses for servers acting as interfaces for public telephone networks. The Internet telephone servers are thus able to determine the network address of a destination server based on the area code of a called station. The servers then establish a communication link via the Internet and use higher level protocol to divide and distribute voice calls through the respective telephone systems. Hence a plurality of communications links can be established between two servers while minimizing the number of hosts on the Internet.

In addition, servers exchanging communications traffic via a wide area packet switched network can maintain a guaranteed quality of service by reserving predetermined virtual paths throughout the packet switched network. The predetermined virtual paths thus ensure a guaranteed bandwidth and latency for quality long distance service.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A method of telecommunication over the Internet comprising:

establishing a dedicated virtual path having a prescribed bandwidth between at least first and second telephony servers having respective network addresses specifying points of presence on the Internet, the first and second telephony servers connected to first and second telephone systems, respectively;

storing in a routing and administration database the prescribed bandwidth and, for each of said telephony servers, the network address and area codes served within the corresponding telephone system;

receiving at the first telephony server a call request initiated by a calling party within the first telephone network, the call request including a calling party number corresponding to the calling party and a called party number, the called party number including an area code;

sending a routing request by the first telephony server to routing and administration database including the calling party number and the area code of the called party number;

outputting from the routing and administration database a bandwidth allocation and the network address of the second telephony server in response to the area code supplied by the routing request, the routing and administration database providing said bandwidth allocation from the prescribed bandwidth;

sending signaling data packets by the first telephony server to the second telephony server along the dedicated virtual path, the signaling data packets including the called party number and the bandwidth allocation; and establishing a communication link between the first telephony server and the second telephony server according to the bandwidth allocation to establish communication between the calling party and a destination corresponding to the called party number.

2. The method of claim 1, wherein the establishing step comprises:

reserving at least the prescribed bandwidth in a plurality of interconnected routers connected to the Internet;

in each of the routers, identifying a connection link having the reserved bandwidth with adjacent routers, the connection links of the respective routers establishing the dedicated virtual path having at least the prescribed bandwidth.

3. A telecommunications system comprising:

a first switched telecommunications network including:

(1) first switching systems serving first customer premises terminals connected to said first switching systems, (2) first trunks connecting the first switching systems, (3) a first system for controlling call set up to selectively establish communication connections between said customer premise terminals over said first trunks, and (4) a first server providing an interface between communication connections over said first trunks and predetermined virtual paths, each having a prescribed bandwidth and transporting data packets carrying communication data;

a second switched telecommunications network including:

(1) second switching systems serving second customer premises terminals connected to said second switching systems, (2) second trunks connecting the second switching systems, (3) a second system for controlling call set up to selectively establish communication connections between said second customer premises terminals over said second trunks, and (4) a second server providing an interface between communication connections over said second trunks and said predetermined virtual paths;

a wide area internetwork using transmission control protocols/internet program (TCP/IP) and connecting the first and second switched telecommunications networks via said predetermined virtual paths to establish a communication connection between one of said first customer premise terminals over said first trunks and one of said second customer premise terminals over said second trunks; and a routing and administration database storing the prescribed bandwidth of each corresponding virtual path relative to a total reserved bandwidth, and for each said server: (1) a network address identifying the corresponding point of presence on the wide area internetwork, and (2) numbering codes served by the corresponding switched telecommunications network.

4. The system of claim 3, wherein the wide area internetwork comprises a plurality of interconnected routers, each reserving the total reserved bandwidth for communications between said first and second servers along the predetermined virtual paths.

5. The system of claim 3, wherein the numbering codes are area codes.

* * * * *